(12) United States Patent
Periquet et al.

(10) Patent No.: US 8,878,657 B2
(45) Date of Patent: Nov. 4, 2014

(54) FORCE FEEDBACK INTERFACE WITH IMPROVED SENSATION

(75) Inventors: Florian Periquet, Laxou (FR); Samuel Roselier, Bourg La Reine (FR); Jose Lozada, Massy (FR); Moustapha Hafez, Arcueil (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 928 days.

(21) Appl. No.: 12/990,083

(22) PCT Filed: Apr. 27, 2009

(86) PCT No.: PCT/EP2009/055039
§ 371 (c)(1),
(2), (4) Date: Jan. 6, 2011

(87) PCT Pub. No.: WO2009/133056
PCT Pub. Date: Nov. 5, 2009

(65) Prior Publication Data
US 2011/0181405 A1 Jul. 28, 2011

(30) Foreign Application Priority Data
Apr. 29, 2008 (FR) ...................................... 08 52899

(51) Int. Cl.
| H04B 3/36 | (2006.01) |
|---|---|
| B60K 37/06 | (2006.01) |
| F16F 9/53 | (2006.01) |
| G05G 5/03 | (2008.04) |
| G05G 1/08 | (2006.01) |

(52) U.S. Cl.
CPC *G05G 1/08* (2013.01); *B60K 37/06* (2013.01); *F16F 9/535* (2013.01); *G05G 5/03* (2013.01); *B60K 2350/102* (2013.01)
USPC ............... 340/407.1; 340/4.13; 340/407.2; 188/267; 188/267.1; 188/267.2

(58) Field of Classification Search
None
See application file for complete search history.

(56) References Cited

U.S. PATENT DOCUMENTS

| 5,267,633 | A | * | 12/1993 | Endo et al. ................. 188/267.1 |
| 5,509,888 | A | * | 4/1996 | Miller ............................. 600/29 |
| 5,632,361 | A | * | 5/1997 | Wulff et al. .................... 188/267 |
| 5,878,997 | A | * | 3/1999 | Miesner ................... 267/140.14 |
| 6,240,779 | B1 | * | 6/2001 | Kung .......................... 73/382 R |

(Continued)

FOREIGN PATENT DOCUMENTS

| DE | 10 2004 04169 | 3/2005 |
| DE | 10 2005 06093 | 6/2007 |

(Continued)

OTHER PUBLICATIONS

Japanese Office Action issued Jul. 9, 2013 in Patent Application No. 2011-506671 with English Translation.

(Continued)

*Primary Examiner* — Curtis King
(74) *Attorney, Agent, or Firm* — Oblon, Spivak, McClelland, Maier & Neustadt, L.L.P.

(57) ABSTRACT

An haptic interface including a knob manipulated by a user, a rotation shaft with a longitudinal axis to which the knob is fixed in rotation, an interaction element with a magneto-rheological fluid in rotation with the shaft, the fluid, a system for generating a magnetic field in the fluid, and a control unit capable of generating orders to the system for generating the magnetic field to modify the magnetic field. The system includes a coil type mechanism generating a variable magnetic field, and a permanent magnet type mechanism generating a permanent magnetic field.

23 Claims, 6 Drawing Sheets

(56) References Cited

U.S. PATENT DOCUMENTS

| | | |
|---|---|---|
| 2001/0041637 A1 | 11/2001 | Leeper |
| 2001/0052893 A1* | 12/2001 | Jolly et al. .................... 345/156 |
| 2002/0057152 A1 | 5/2002 | Elferich et al. |
| 2003/0110852 A1* | 6/2003 | Golly et al. ..................... 73/180 |
| 2005/0126871 A1* | 6/2005 | Jolly et al. .................... 188/267 |
| 2006/0238510 A1* | 10/2006 | Panotopoulos et al. ....... 345/168 |
| 2007/0013215 A1 | 1/2007 | Browne et al. |
| 2010/0031803 A1 | 2/2010 | Lozada et al. |

FOREIGN PATENT DOCUMENTS

| | | |
|---|---|---|
| DE | 10 2006 01280 | 9/2007 |
| EP | 1 168 622 | 1/2002 |
| JP | 2000-81917 A | 3/2000 |
| JP | 2002-108470 A | 4/2002 |
| JP | 2002 189559 | 7/2002 |
| JP | 2004-175257 A | 6/2004 |
| JP | 2004-538520 A | 12/2004 |
| WO | 2005 073833 | 8/2005 |

OTHER PUBLICATIONS

International Search Report issued Jul. 10, 2009 in PCT/EP09/055039 filed Apr. 27, 2009.

* cited by examiner

FORCE FEEDBACK INTERFACE WITH IMPROVED SENSATION

TECHNICAL FIELD AND PRIOR ART

The present invention relates to sensorial interfaces providing the user with force feedback, used particularly in the field of haptic devices and in the fields of virtual reality and the automobile.

This type of haptic interface may for example be used in automobile vehicles, forming an onboard haptic interface to assist the car driver. This interface is in the form of a knob with a force feedback, so that the user can interact with various vehicle equipment or accessories such as the GPS (Global Positioning System), radio, air conditioning, etc.

Such a knob is actually used in top-of-the-range automobiles.

This knob has no sensorial force feedback. The resistance felt by the user to change from one notch to the next is invariable and is predefined during the design of the knob. Thus, the intensity of the force feedback is constant, and is independent of the speed of manipulation of the knob or the required control type.

The resistance applied by the knob is obtained by means of a DC motor associated with reduction gears. Firstly, this type of resistance generator does not provide much sensitivity in the force felt by the user. Secondly, its size and mass are not negligible. This limits its applications in onboard systems.

Haptic interfaces also exist in which the force feedback is obtained using a magneto-rheological fluid. By applying a magnetic field to this fluid, the apparent viscosity of the fluid increases so that a braking force can be applied to an element fixed to the knob and immersed in this fluid. Such interfaces are described in US document 2002/0057152. However, in the case of an application in an onboard system, known interfaces in known structures cannot produce an attractive compromise between their size, the resistive torque produced by the knob and the electrical consumption to generate the magnetic field in the magneto-rheological fluid.

Consequently, one purpose of the present invention is to provide a haptic interface with a force feedback providing a wide range of resistive torque within a smaller volume and for which the electrical consumption is adapted to onboard applications.

Another purpose of the present invention is to offer a haptic interface with a force feedback providing an interactive easy-to-use, intuitive and high performance tool.

PRESENTATION OF THE INVENTION

The purposes mentioned above are achieved by a haptic interface in which the resistance to the movement of a knob manipulated by a user is generated using a magneto-rheological fluid, modification of the apparent viscosity of this fluid being obtained by means of a magnetic circuit with one or several permanent magnets associated with a system to generate a variable magnetic field.

Thus, unlike interfaces using a magneto-rheological fluid according to the state of the art, resistance is applied when there is no electrical power supply. The magnetic field of the permanent magnet can also possibly be cancelled or reinforced using the variable magnetic field generation system, that can be used to create a wide range of resistive torques adaptable to each type of interface actuation, unlike existing interfaces with electrical motors for which force feedback values are fixed.

For example, the magnetic field generated by the magnet is sufficient so that the apparent viscosity of the fluid is such that the knob is prevented from all movement, thus locking the interface in the lack of any current. The interface is unlocked by the application of a magnetic field using the system to generate a variable magnetic field. Unlike existing interfaces, this avoids the need to provide a permanent power supply to the magnetic field generation system to block the knob, or the need for a complex mechanism to lock and unlock the knob that would make use of the interface less easy and less intuitive.

This wide range of resistive torques is also obtained with a low electrical consumption, because some or all of the magnetic field required to produce the maximum resisting force is generated without any electrical consumption by the permanent magnet, while limiting the size.

Furthermore, according to the invention, the actuation range may be the same as that of existing interfaces but the electrical consumption is reduced. The electrical power is used to generate either a magnetic field that is additive to the magnetic field of the magnet thus increasing the amplitude of the perceived torque, or to generate a magnetic field opposing the magnetic field of the magnet, which cancels the effect of the magnet. This doubles the usage range for a given electrical power.

Therefore, the haptic interface developed enables semi-active control of the force on the knob to generate different sensations, by means of a magneto-rheological fluid while being smaller in size and having lower electrical consumption. A "semi-active system" means a system providing a compromise between an "active" system and a "passive" system. It can be controlled in real time but energy cannot be injected into the controlled system. It controls the haptic feedback perceived by the user by reaction by absorbing/dissipating energy according to a predefined control law.

In one particularly advantageous example, the interaction element comprises a cylindrical element with a circular section, and the means of generating a magnetic field generate a radial field relative to this interaction element.

The subject-matter of the present invention is then mainly a haptic interface comprising an element that interacts with a user, a rotation shaft to which said user interaction element is fixed in rotation, an element that interacts with a fluid, said fluid interaction element being fixed in rotation to said shaft, said fluid being of magneto-rheological type, a system for generating a magnetic field in said fluid, and a control unit capable of generating orders to said magnetic field generation system so as to modify the magnetic field, said system comprising means of generating a variable magnetic field and means of generating a permanent magnetic field.

The haptic interface according to the invention may comprise at least one angular position, angular velocity and/or angular acceleration sensor for said shaft, said control unit generating orders as a function of information provided by said at least one position, velocity and/or angular acceleration sensor.

In another example, the control unit generates orders to the magnetic field generation system at fixed or variable given time intervals.

Said system for generating a magnetic field advantageously generates a radial magnetic field which can increase the damping forces.

For example, the means of generating a permanent magnetic field comprise at least one permanent magnet, and the means of generating a variable magnetic field comprise for example at least one electromagnetic coil. These two elements are associated with a magnetic circuit made of ferromagnetic materials. The centre line of the coil is advantageously coincident with the centre line of the rotation shaft.

For example, the fluid interaction element comprises at least one cylindrical wall of revolution with a longitudinal axis and a head, said head being fixed to the rotation shaft, the fluid coming into contact on an inner face and an outer face of said sidewall. Advantageously, the fluid interaction element comprises several concentric sidewalls at a spacing from each other and fixed to the head, which increases the shear forces applied to the fluid.

In one example embodiment, the means of generating a permanent magnetic field are arranged inside the fluid interaction element and are immobile relative to it, and the means used to generate a variable magnetic field are arranged inside the fluid interaction element and are immobile relative to it. The coil can then surround the permanent magnet.

In one variant, the permanent magnet may comprise at least one sleeve surrounding the coil In another variant, the means of generating a permanent magnetic field are arranged between two concentric sidewalls of the interaction element, and are immobile relative to them.

In yet another variant, the means of generating a permanent magnetic field are fixed on the fluid interaction element and the means of generating a variable magnetic field are immobile relative to it.

The means of generating a variable magnetic field can also be arranged inside the interaction element and immobile relative to it.

The means of generating a permanent magnetic field and the means of generating a variable magnetic field may also be fixed on the fluid interaction element.

In another example embodiment, the shaft passes through the system for generating the magnetic field.

For example, the position sensor may be provided at a longitudinal end of the shaft and it may comprise a part fixed to the shaft in rotation and a part that is immobile relative to the shaft. The part fixed to the shaft may then be an optical wheel and the immobile part may be an optical fork.

Advantageously, the interface according to the invention comprises a rod passing through the shaft from one side to the other, said rod can move longitudinally, and a device for detecting displacement of said rod.

The interface may also comprise a thermal device capable of modifying the temperature of the user interaction element, the thermal device comprising at least one Peltier cell and/or a device capable of vibrating the user interaction element.

The subject-matter of the present invention is also a haptic assembly comprising a frame and the interface according to the present invention mounted on this frame, said interface being free to move along the axis of the shaft.

The interface may be free to move in translation along at least one direction orthogonal to the longitudinal axis and/or is free to rotate about at least one direction orthogonal to the longitudinal axis.

The haptic assembly according to the invention may comprise force feedback devices to oppose resistance during a movement along at least one axis orthogonal to or about the longitudinal axis.

BRIEF DESCRIPTION OF THE DRAWINGS

The present invention will be better understood after reading the description given below and the appended drawings in which.

DETAILED PRESENTATION OF PARTICULAR EMBODIMENTS

We will now describe details of example embodiments of the haptic interface according to the present invention.

The haptic interface has at least one degree of rotation about an X axis generally forming an axis of revolution for the interface.

Figure 1A:
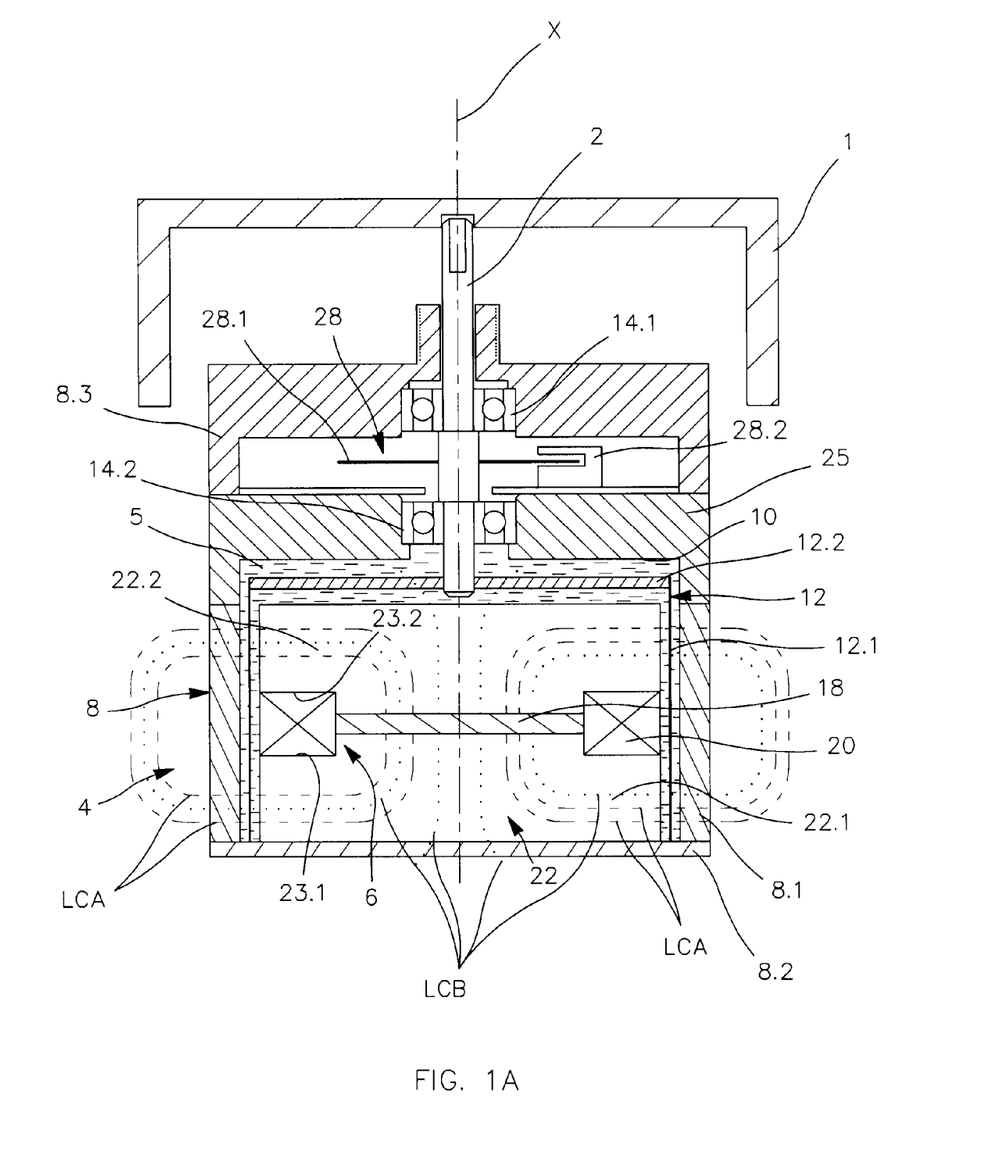
FIG. 1A is a longitudinal diagrammatic sectional view of a first example embodiment of a haptic interface according to the present invention.
Figure 1B:
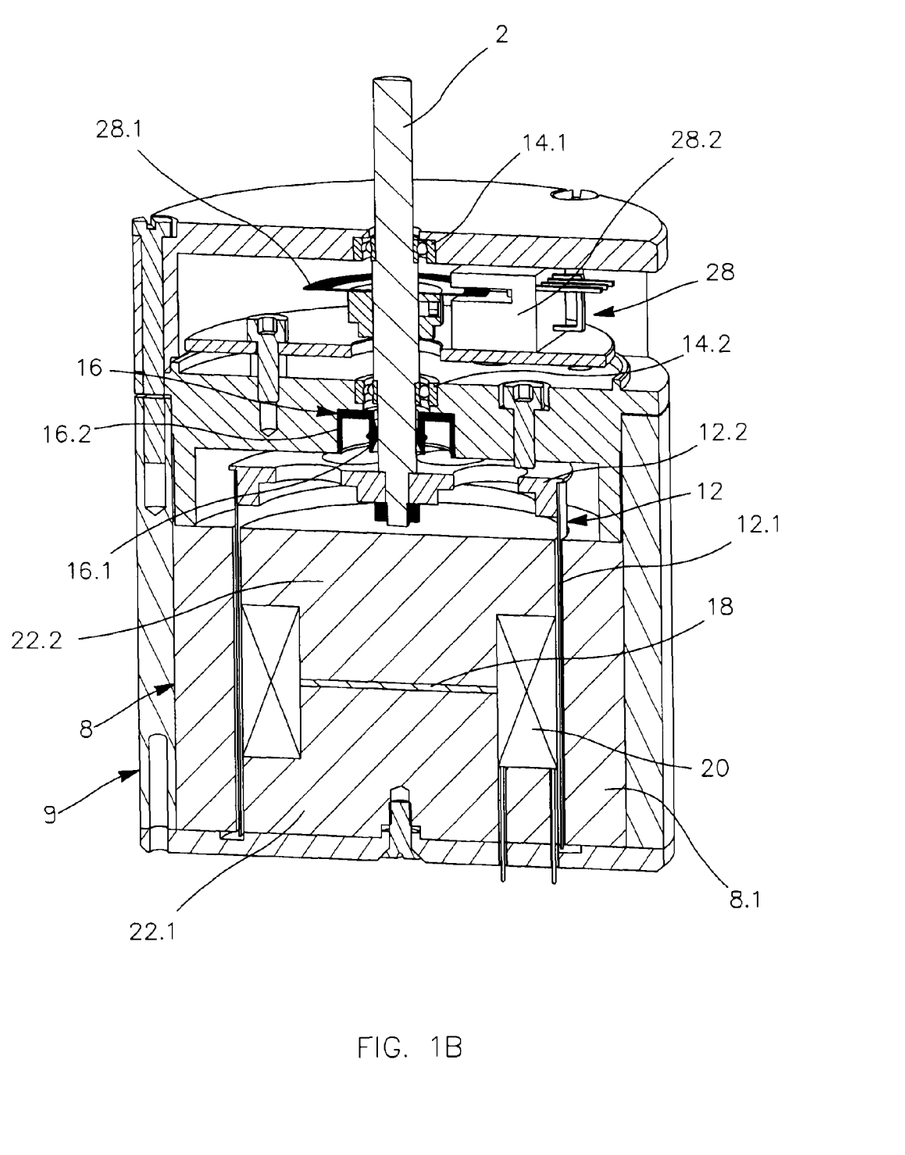
FIG. 1B is a perspective longitudinal sectional view of an industrial embodiment of the interface in FIG. 1A.

FIGS. 1A and 1B show a first example embodiment of an interface according to the invention comprising an element 1 that will be manipulated by a user and that will be called a "knob" in the following, this knob is mounted free to move in rotation about a shaft 2 with axis X, and a device for generating a resisting force 4 opposing rotation of the shaft 2.

The device 4 comprises a fluid for which the characteristics can be modified by means of a magnetic field and a system for generating a magnetic field 6 that fits in a housing 8. The fluid may for example be a magneto-rheological liquid 5.

The cylindrical shaped housing 8 is formed by a sidewall 8.1, a bottom head 8.2 and a top head 8.3.

The shaft 2 passes through the top head 8.3 and penetrates inside the housing 8.

The housing 8 delimits a sealed chamber 10 confining the magneto-rheological fluid 5, this chamber being subjected to a magnetic field generated by the system 6.

The device 4 also comprises an element 12 fixed in rotation to shaft 2 and housed in the sealed chamber 10. This element can interact with the magneto-rheological fluid 5, rotation of the element 12 being more or less slowed by the magneto-rheological fluid 5 depending on its apparent viscosity.

In the example shown, the element 12 is cylindrical and bell-shaped and has a circular-cross section formed from a sidewall 12.1 and a head 12.2. The shape of the sealed chamber corresponds to the shape of the bell 12, which reduces the required quantity of fluid. A longitudinal section through the element 12 interacting with the fluid is in the form of an inverted U.

The head 12.2 is fixed on the end of the shaft 2 penetrating into the sealed chamber 10 and the chamber 10.

The sidewall 12.1 is made of a material capable of conducting a magnetic field, advantageously a ferromagnetic field, and the magnetic permeability of the sidewall is reduced, improving conduction of the magnetic field.

In the example shown, the sealed chamber 10 is completely full of magneto-rheological fluid 5. Therefore, the bell 12 is completely immersed in the magneto-rheological fluid 5. More particularly, the inner and outer faces of the wall 12.1 are in contact with the magneto-rheological fluid 5. But it would be possible that only the sidewall 12.1 is immersed in the magneto-rheological fluid 5.

The shaft 2 is supported by bearings 14.1, 14.2 isolated from the magneto-rheological fluid 5 in a sealed manner. A sealing element 16 visible in FIG. 1B is provided between the sealed chamber 10 and the zone containing the bearings 14.1, 14.2. The sealing means surrounds the rotation shaft 2, which comprises an inner lip 16.1 surrounding the rotation shaft 2 and providing a dynamic seal and an outer lip 16.2 in static contact with the housing. Leak tightness may be achieved by any other type of seal, conventional or other, for example such a ferrofluid held in place by means of a permanent magnet.

The magnetic field generation system 6 is capable of generating a variable magnetic field so as to vary the viscosity of the magneto-rheological fluid 5.

According to the present invention, the system 6 comprises a means 18 of generating a permanent magnetic field in the absence of an electrical power supply, for example a permanent magnet, and a means 20 capable of generating a variable magnetic field.

For reasons of simplicity, the permanent magnetisation means 18 will be referred to as a permanent magnet, but any other device offering such a magnetisation is within the scope of the present invention.

In the example shown, the magnet is formed from a disk arranged inside the bell 12.

The means of generating a variable magnetic field 20 is for example formed by at least one coil placed inside the bell 12 and surrounding the permanent magnet 20. The coil(s) has (have) an axis coincident with the longitudinal axis X.

Furthermore, the system 6 comprises a magnetic circuit to guide the magnetic field such that the field lines pass through the sidewall 12.1 of the bell 12 and close inside the sidewall 8.1, such that the magnetic field actually affects the magneto-rheological fluid 5 on each side of the sidewall 12.1. In general, the permanent magnet 18 and the coil 20 are capable of generating a magnetic field passing through the fluid and closing on the magnet and the coil.

The magnetic circuit comprises a part 22 made of a material capable of conducting the magnetic field forming a core located inside the bell and inside which the permanent magnet 18 and the coil 20 are located.

In the example shown, the core 22 in the form of a regular cylinder comprises a lower part 22.1 and an upper part 22.2, the magnet and the coil being sandwiched between the two parts 22.1, 22.2.

The chamber 10 is delimited firstly by the outer faces of the core 22, the outer sidewall 8.1 and an upper separation wall 25 through which the rotation shaft 2 passes.

In particular, in the example shown, the parts 22.1 and 22.2 each comprise a shoulder 23.1, 23.2 defined between a larger diameter part and a smaller diameter part, the magnet 18 is placed between the free ends of the smaller diameter parts and the coil 20 is mounted around the smaller diameter parts bearing on the shoulders 23.1, 23.2 through its two axial ends.

The magnetic circuit also comprises the outer wall 8.1 of the housing 8, forming the outer wall of the sealed chamber 10.

It would be possible for only the inner part of the outer wall 8.1 to be made of a magnetic material and not the entire wall 8.1, which would further confine the magnetic field.

The magnetic circuit fits into an envelope 9, forming the outside envelope of the haptic device.

The magnetic circuit is also formed by the sidewall 12.1 of the bell 12 made from a material capable of conducting a magnetic field.

The magnet field lines LCA pass through the upper part 22.1 of the core, then the chamber 10 through the sidewall 12.1 of the bell 12, the outer sidewall 8.1 of the housing 8, the lower part 22.2 of the core 22 and close on the magnet 18.

The field lines LCB of the coil 20 follow the same magnetic circuit as the magnetic field lines LCA of the permanent magnet 18.

This architecture according to the present invention ensures a very good guidance of the magnetic field generated by the magnet 18 and the coil 20.

Thus, the direction and intensity of the current circulating in the coil 20 can be controlled to amplify or reduce or even cancel out the magnetic field generated by the magnet 18.

The central core 22 and the wall 8.1 form a stator, while bell 12 that turns around the X axis forms a rotor.

Advantageously, the upper part of the housing in which the bearings 14.1, 14.2, the shaft and the head of the bell 12.2 are made from a non-magnetic material, and the bottom head 8.2 of the housing is also made of a non-magnetic material to prevent the dispersion of field lines.

Means 28 are also provided for measuring the angular position of the bell 12 and therefore the knob 1. For example, these means are placed between the two bearings 14.1, 14.2 and are formed by an optical encoder type rotation sensor formed by an encoder wheel 28.1 fixed in rotation with the shaft 2 and an optical fork 28.2 fixed on the housing.

Any sensor capable of providing a logical or analogue image of the position of the bell 12 is within the scope of the present invention.

The sensor 28 is connected to a control unit (not shown) to which it transmits its measurements.

The coil 20 is connected to a source of electrical current (not shown) controlled by the control unit so as to vary the intensity and the direction of the current in the coil as a function of the position of the bell 12 and therefore the knob 1 measured by the sensor 28.

We will now explain the operation of this haptic interface according to the present invention.

When the user manipulates the knob 1, particularly when he pivots it in one direction or another about the X axis, the rotation sensor 28 detects rotation of the shaft 2 and transmits this information and the measurement of the angular displacement, the angular velocity and/or the angular acceleration of the shaft 2, and therefore of the bell 12, to the control unit.

As a function of the information received, the control unit generates an order to the electrical power supply to send a current with a given intensity in a given direction as a function of pre-recorded models or as a function of a communication with an external system (for example such as the GPS system in an automobile), to the coil 20.

This current may be zero if the control unit decides that the magnetic field generated by the permanent magnet 18 is sufficient to modify the apparent viscosity of the fluid 5 to generate sufficient resisting forces on the bell 12.

This current may be such that it increases the magnetic field, therefore the apparent viscosity of the fluid and consequently resisting forces on the bell 12.

This current may be such that the coil 20 generates a magnetic field in the direction opposite to the direction of the magnetic field produced by the permanent magnet 18, the addition of the two fields then gives a resultant magnetic field with reduced intensity relative to the intensity of the field produced by the permanent magnet 18 alone, or even zero intensity.

The characteristics of the current sent to the coil may also depend on the speed with which the knob 1 is turned. The sensor may be a displacement, velocity or acceleration sensor. Information about the movement is processed by the control device so as to define the set value to be sent to the power device.

With the present invention, a resisting force can be generated when there is no current. Thus, by choosing the permanent magnet (and more particularly the magnetic field that it generates) such that it modifies the apparent viscosity of the fluid so that the resisting forces on the bell fix the knob in rotation, the interface can be locked without consuming any electricity.

Furthermore, high magnetic field values can be achieved by coupling a permanent magnet and a coil, and therefore high resistive torques can be applied to the bell while limiting the size of the interface and the required electrical power.

Existing systems that only use one coil are much larger to obtain the same resistive torque values.

Figure 2:
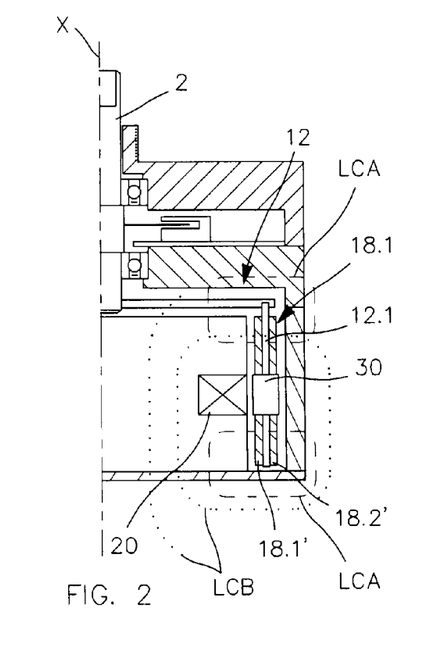
FIG. 2 is a longitudinal sectional view of a first variant embodiment of the interface in FIG. 1, in which the permanent magnet is free to move.

FIG. 2 shows a variant embodiment of the interface in FIGS. 1A and 1B, in which the permanent magnet reference 18' is onboard the bell 12.

More particularly, the bell 12 comprises magnets 18.1' on the inner face and magnets 18.2' on the outer face of its sidewall 12.1. For example, they may be tubular. In the example shown, the bell comprises an annular projection 30 at about the mid-height of the bell, the tubular magnets 18.1' and 18.2' being arranged above and below this projection.

It would be possible to make two sleeves from a permanent magnetic material extending from one end of the bell to the other.

Figure 3:
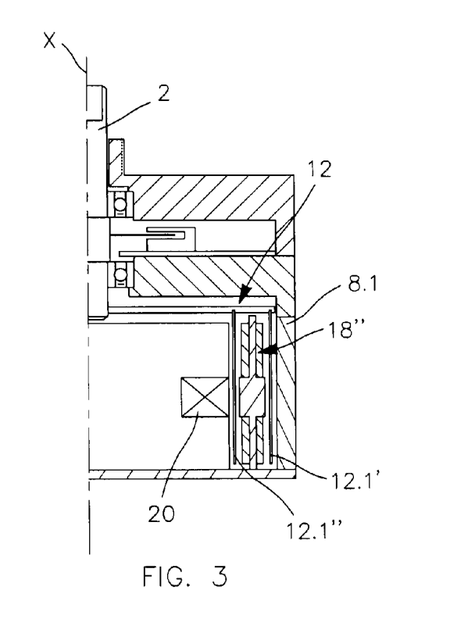
FIG. 3 is a half-longitudinal sectional view of a second variant embodiment of the interface in FIG. 1.

FIG. 3 shows another variant embodiment of the interface according to the invention in which the bell is doubled up so as to increase the interaction surface area with the fluid.

In the example shown, the bell 12 comprises concentric cylindrical outer and inner sidewalls 12.1' and 12.1" fixed to the head 12.2 and at a spacing from each other to enable the fluid to penetrate between the two walls.

The fluid is located on each side of the two concentric walls, the shear surface of the fluid is approximately twice that shown on the interface in FIGS. 1A and 1B. Obviously, it would be possible to provide more than two concentric walls and in particular their number depends on the maximum allowable size.

In the example shown, the permanent magnet 18" is placed between the two walls 12.1' and 12.1", this permanent magnet being identical to the permanent magnet in FIG. 2, however it is immobile relative to the bell because it is fixed to the bottom head 8.2 of the housing 8 and forms a sleeve inserted between the two walls 12.1' and 12.1" of the bell.

A bell with a skirt formed from several concentric walls could also be used in a structure identical to that in FIGS. 1A and 1B.

Figure 4:
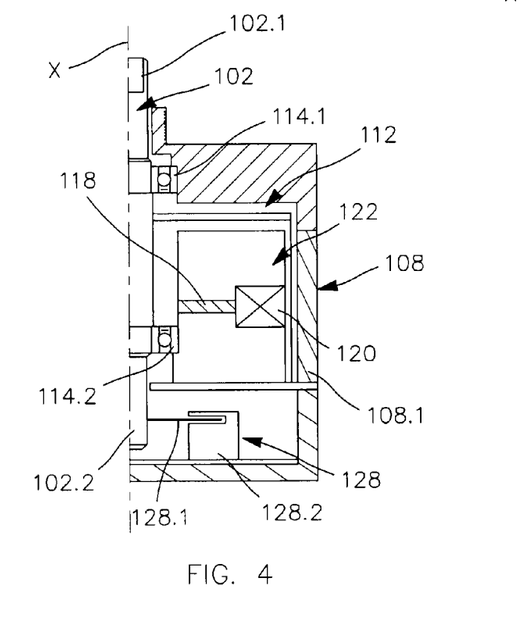
FIG. 4 is a half-longitudinal sectional view of a second example embodiment of a haptic interface according to the present invention, in which the knob rotation shaft passes through the internal stator.

FIG. 4 shows another example embodiment of an interface according to the present invention, this interface is different from that described above in that the rotation shaft passes through the stator, and more particularly the magnetic field generation system.

The references used to describe this example embodiment will be the same as those used for the description of FIGS. 1A and 1B plus 100.

The interface comprises a shaft 102 with a longitudinal X axis to which the knob that will be manipulated by the user is fixed at a first end 102.1.

The shaft 102 is fixed free to rotate in a housing 108 using bearings 114.1 and 114.2.

The housing 108 forms a stator and the shaft 102 forms a rotor to which a bell 112 is fixed in rotation and is immersed in a fluid with viscosity properties that are variable with the magnetic field.

Unlike the example in FIGS. 1A and 1B, the shaft passes through the central core from one side to the other.

The position, velocity or acceleration sensor 128 in this representation is located at a lower end of the shaft 102.2 opposite the end to which the knob is fixed (not shown). The knob is of the same type as described above, and for example comprises an encoder wheel 128.1 and an optical fork 128.2. The sensor is isolated from the fluid at the bearing 114.2.

The magnetic circuit is similar to that in the example in FIGS. 1A and 1B, it comprises a permanent magnet 118 in the form of a disk at the centre of the core and a coil 120.

The sidewall 108.1 of the housing and the core 122 are made from a magnetic material.

This interface operates in exactly the same way as that in FIGS. 1A and 1B and it will not be described again.

Figure 5:
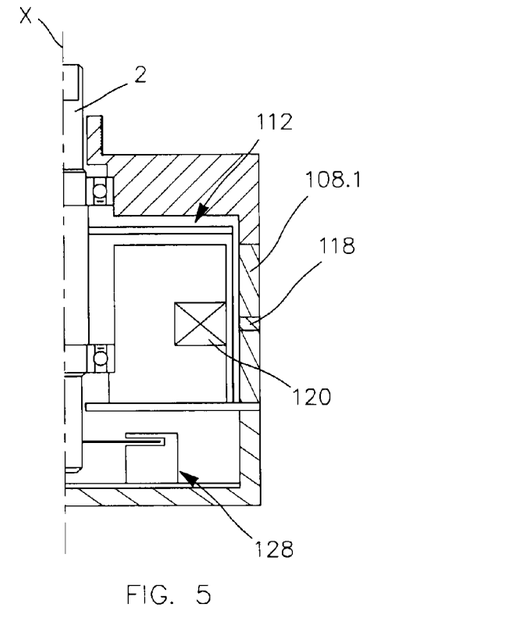
FIGS. 5 to 9 are half-longitudinal sectional views of variant embodiments of the interface in FIG. 4 in which the knob rotation shaft passes through the internal stator.

FIG. 5 shows a variant embodiment of the second example embodiment of the interface in which the permanent magnet 118 is no longer placed in the core inside the bell 112 but instead is in the sidewall 108.1 of the housing. In this configuration, the magnet is in the form of a ring provided radially aligned with the coil 120 and coaxially with it. The sidewall 108.1 is made from a material capable of conducting a magnetic field.

Figure 6:
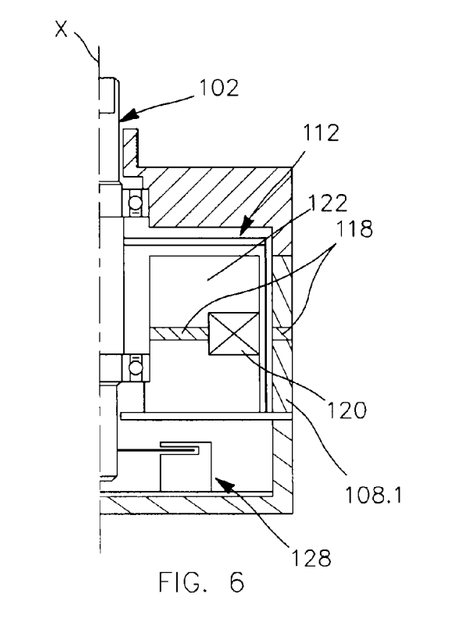

Another variant of the interface in FIG. 4 is shown in FIG. 6, in this case the permanent magnet 118 is located both in the central core 122 and in the sidewall 108.1 of the housing 108.

Figure 7:
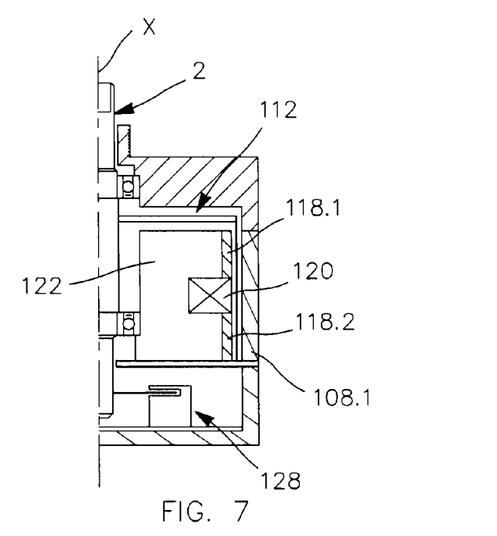

FIG. 7 shows another variant embodiment of the second example embodiment in which the permanent magnet 118 is no longer located inside the core 122, but is now outside the core forming its outside envelope.

In the example shown, the central core 122 is made of a single-piece magnetic material and it comprises an annular groove in which the coil 120 is installed. The coil 120 then projects radially from the radially outer periphery of the core.

The magnet 118 is formed from two cylindrical sleeves 118.1, 118.2, one of which is arranged above the coil and the other below the coil.

It may be possible to place the permanent magnet 118 in the sidewall 108.1 of the housing.

Figure 8:
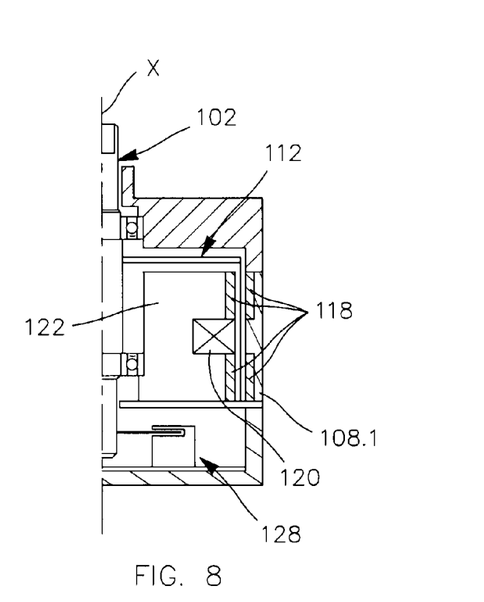

Furthermore, FIG. 8 shows an interface in which the permanent magnets 118 are placed on the outside periphery of the central core 122 and in the sidewall 108.1 of the housing.

The sidewall 108.1 is made from a material capable of conducting a magnetic field.

Figure 9:
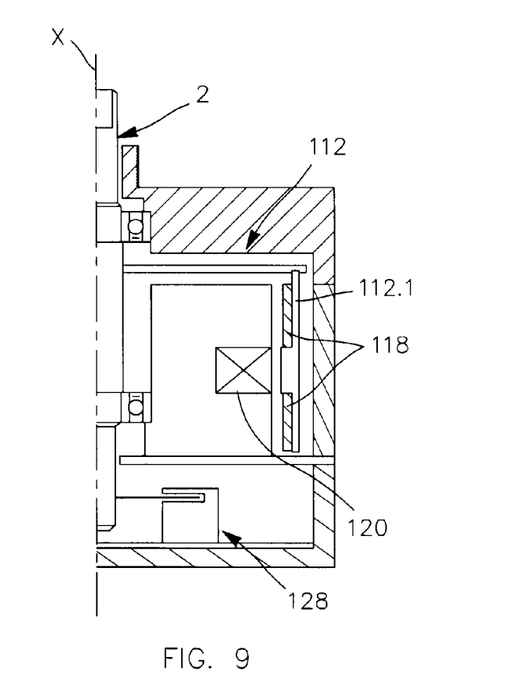

FIG. 9 shows another variant embodiment in which the permanent magnet 118 is free to move and is fixed to the sidewall 112.1 of the bell 112.

Interfaces according to the second example embodiment comprising a bell with several concentric skirts similar to that shown in FIG. 3 are included within the scope of the present invention.

Figure 10:
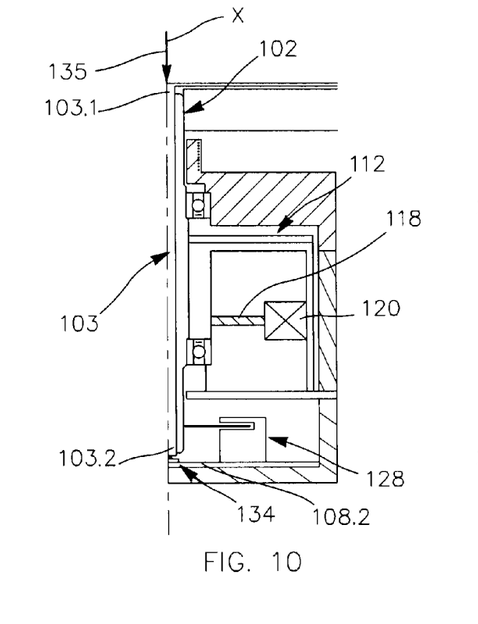
FIG. 10 is a longitudinal sectional view of an interface identical to that in FIG. 4 integrating a longitudinal displacement of the knob. The shaft is hollow and is used to position a click type knob below the shaft.

FIG. 10 shows the interface in FIG. 4 in which a degree of freedom has been added to the knob. The knob is free to move along the X axis. This is done by making the shaft 102 hollow and installing a rod 103 free to move along the X axis inside the shaft 102. The rod 103 is fixed to the knob at a first axial end 103.1. The rod passes through the shaft 102 from one side to the other.

The rod 103 and the shaft are fixed in rotation, and rotation of the knob is transmitted to the shaft through the rod 103.

An axial displacement sensor 134 is provided to detect axial displacement of the rod 103. For example, this sensor may be an electrical contactor 134 placed on the bottom head 108.2 of the housing facing the second longitudinal end 103.21 of the rod 103. When the rod 103 is moved axially downwards along the arrow 135, it activates the contactor 134. This electrical contactor is connected to the control unit and may for example be used as a validation system.

The user can then select a tab in a menu with a single hand by moving a slide by rotating the knob around the X axis, and validating this choice by pushing the knob causing axial displacement of the rod 102 and switching of the contactor 134.

The axial displacement sensor 134 may be of any other type, for example optical or magnetic.

In the example shown, only the rod 103 moves along the X axis. However, it would be possible that the entire interface formed by the housing and the knob moves along the X axis.

This additional degree of freedom may obviously be applied to all example embodiments.

The second example embodiment is particularly suitable for longitudinal displacement of the knob because its displacement can easily be captured using the bottom head of the interface that is not used.

Figure 11:
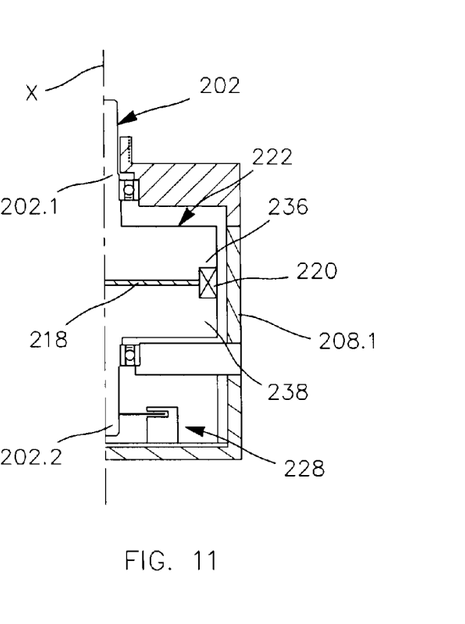
FIGS. 11 and 12 are different variant embodiments of a third example embodiment of an interface according to the invention.
Figure 12:
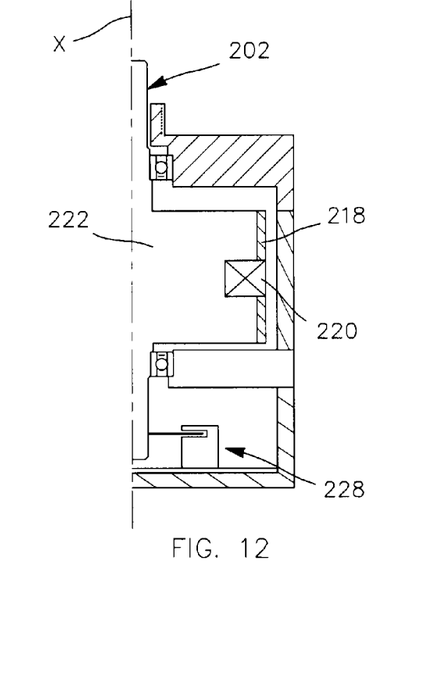

FIGS. 11 and 12 show a third example embodiment of an interface according to the present invention, different from the first and second example embodiments in that the interface no longer comprises an interacting bell in the fluid, but the central core fixed in rotation with the rotation shaft interacts directly with the fluid to be damped.

The references in this figure are the same as those used in the first example embodiment plus 200.

As can be seen in FIG. 11, the core 222 and the shaft 202 are fixed in rotation, the core then being driven in rotation in the fluid.

The core 222 comprises an upper half-part 236 on which there is an axial projection 202.1 forming the part of the shaft 202 fixed to the knob and a lower half-part 238 on which there is an axial projection 202.2 to which the position sensor 228 is fixed. These two half-parts are fixed to each other, for example glued or fixed by any other means.

The permanent magnet 218 in the form of a disk is inserted between the upper half-part 236 and the lower half-part 238. The coil is onboard in the central core pivoting with the magnet 218.

FIG. 12 shows yet another variant in which the coil and the magnet are onboard in the central core pivoting with the magnet 218. The permanent magnet 218 could also be fixed onto the housing and with only the coil 220 is fixed to the central core 222.

Obviously, the numbers of coils and/or magnets mentioned in the above description are in no way limitative and they may vary depending on the configuration. The shapes, particularly of the magnets, are also in no way limitative.

Figure 13:
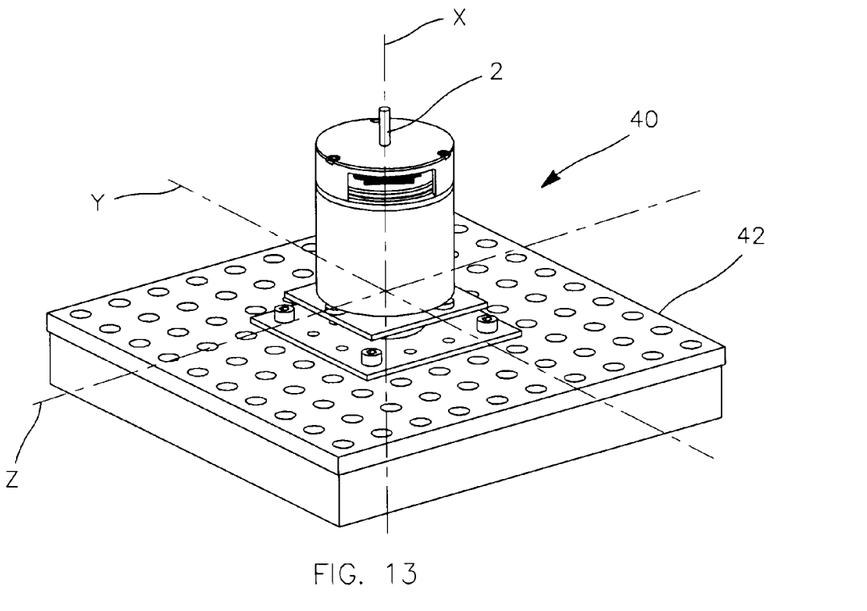
FIGS. 13 and 14 are perspective views of an interface according to the invention associated with a translation and rotation device respectively.

FIG. 13 shows the interface according to the present invention integrated into a device 40 fitted with a chassis 42 onto which it is installed capable of translating along the Y and Z axes, thus forming a "joystick" type control. The device may comprise force feedback systems in these Y and Z directions.

Figure 14:
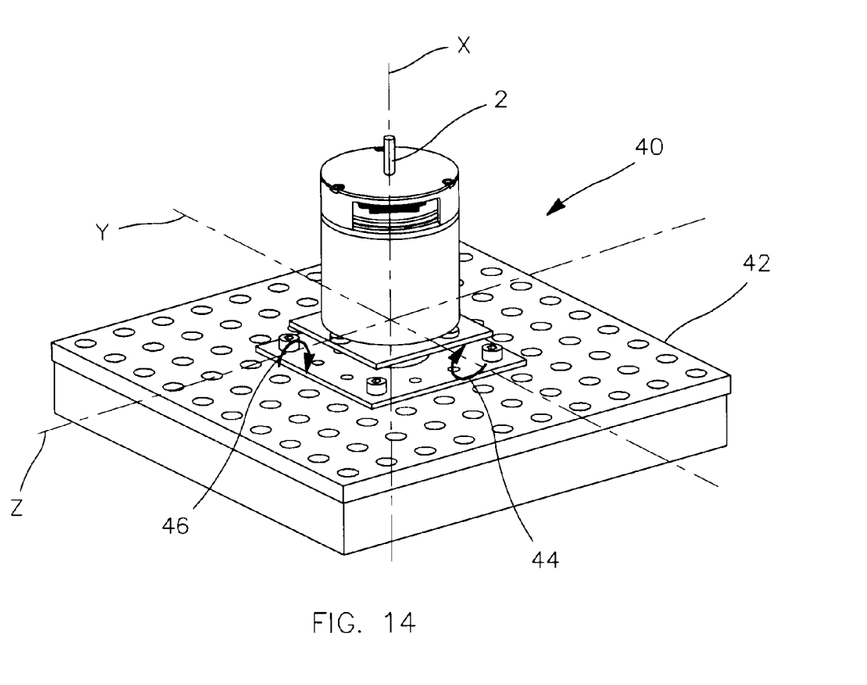

In FIG. 14, the interface is mounted free to pivot about the Y and Z axes along the directions of arrows 44, 46 respectively.

For example, these integrations can be used to add functions to which the knob is already coupled.

A thermal device could also be integrated into the knob to simulate temperature variations, for example using a Peltier cell. Thus for example, for control of the heating-air conditioning system, the user ordering a temperature drop would feel an impression of cold at his fingers manipulating the knob, and if he orders a temperature rise, he would feel an impression of heat at his fingers manipulating the knob. The information thus transmitted to the user would thus be more intuitive, the user could activate the knob only as a function of what he feels. The driver then no longer needs to look at the screen, thus improving driving safety and comfort.

It would also be possible to provide a device generating vibrations in the knob to provide additional information to the user. For example, if the user receives a telephone call while he is navigating in a menu, he might be informed by a vibration.

It would also be possible to use force or torque sensors to measure the force or torque applied to the knob and to adapt the resistance to the value of this force or torque. For example, if the torque applied to the knob is high, the resistance to rotation generated by the fluid may be increased by generating a higher magnetic field.

Obviously, the control unit can receive information other than the angular position of the rotation shaft, the angular acceleration or angular velocity of the knob to control the magnetic field to be applied to the fluid, for example information about the pressure applied on it, information concerning the vehicle state (for example the velocity, GPS position, inside and outside temperature, etc.).

The applied feedback may also be independent of external information, for example using a time base. The haptic feedback does not depend on the actual movement made but on time. For example, sudden haptic changes may be applied at a fixed frequency, regardless of the rotation speed.

It would also be possible to couple external information and a time base to control the magnetic field generation system.

The invention claimed is:

1. An haptic interface comprising:
   an element that interacts with a user, a rotation shaft with a longitudinal axis to which the user interaction element is fixed in rotation;
   an element that interacts with a fluid, the fluid interaction element being fixed in rotation to the shaft, the fluid being of magneto-rheological type;
   a system that generates a magnetic field in the fluid configured to modify viscosity of the fluid;
   a control unit configured to generate orders to the magnetic field generation system so as to modify the magnetic field;
   a housing containing the interaction element, the magneto-rheological fluid, and the system for generating a magnetic field, the housing including a sidewall and two end walls, the rotation shaft passing through one of the end walls and penetrating inside the housing, the housing forming a sealed chamber confining the magneto-rheological fluid; wherein
   the user interaction element is arranged outside the housing,
   the system for generating a magnetic field comprising means for generating a variable magnetic field and means for generating a permanent magnetic field, the means for generating a permanent magnetic field being arranged in the housing to cause an increase in the fluid viscosity in absence of a system electrical power supply, and the means for generating a variable magnetic field and the means for generating a permanent magnetic field are each located inside the fluid interaction element and are each immobile relative to the housing.

2. The haptic interface according to claim 1, further comprising at least one angular position, angular velocity, and/or angular acceleration sensor of the shaft, the control unit generating orders as a function of information provided by the at least one angular position, velocity, and/or acceleration sensor.

3. The haptic interface according to claim 1, in which the control unit generates orders to the magnetic field generation system at given fixed or variable time intervals.

4. The haptic interface according to claim 1, in which the system for generating a permanent magnetic field generates a radial magnetic field.

5. The haptic interface according to claim 1, in which the means for generating a permanent magnetic field comprises at least one permanent magnet.

6. The haptic interface according to claim 1, in which the means for generating a variable magnetic field comprises at least an electromagnetic coil.

7. The haptic interface according to claim 1, in which the fluid interaction element comprises at least one cylindrical wall of revolution with a longitudinal axis and a head made from a non-magnetic material, the head being fixed to the rotation shaft, the fluid coming into contact on an inner face and an outer face of the sidewall.

8. The haptic interface according to claim 7, in which the fluid interaction element comprises plural concentric sidewalls at a spacing from each other and fixed to the head made of non-magnetic material.

9. The haptic interface according to claim 1, in which the means for generating a variable magnetic field comprises at least an electromagnetic coil and the means for generating a permanent magnetic field comprises at least one permanent magnet, the coil surrounding the permanent magnet.

10. The haptic interface according to claim 1, in which the means for generating a variable magnetic field comprises at least an electromagnetic coil and the means for generating a permanent magnetic field comprises at least one permanent magnet, the permanent magnet including at least one sleeve surrounding the coil.

11. The haptic interface according to claim 6, in which the means for generating a permanent magnetic field is fixed relative to the housing.

12. The haptic interface according to claim 1, in which the shaft passes through the magnetic field generation system.

13. The haptic interface according to claim 2, in which the angular position, angular velocity, or angular acceleration sensor is provided at one shaft longitudinal end and comprises a part fixed in rotation with the shaft and a part immobile relative to the shaft.

14. The haptic interface according to claim 13, in which the part fixed on the shaft is an optical wheel and the immobile part is an optical fork.

15. The haptic interface according to claim 1, further comprising:
a rod passing through the shaft from one side to the other, the rod configured to move longitudinally; and
a device for detecting displacement of the rod.

16. The haptic interface according to claim 1, further comprising a thermal device configured to modify a temperature of the user interaction element.

17. The haptic interface according to claim 16, in which the thermal device comprises at least one Peltier cell.

18. The haptic interface according to claim 16, further comprising a device configured to vibrate the user interaction element.

19. The haptic assembly comprising:
a frame; and
the interface according to claim 1, mounted on the frame, the interface being free to move along the axis of the shaft.

20. The haptic assembly according to claim 19, in which the interface is free to move in translation along at least one direction orthogonal to the longitudinal axis.

21. The haptic assembly according to claim 19, in which the interface is free to move in rotation about at least one direction orthogonal to the longitudinal axis.

22. The haptic assembly according to claim 20, further comprising force feedback devices to oppose a resistance during a movement along at least one axis orthogonal to or about the longitudinal axis.

23. The haptic assembly according to claim 21, further comprising force feedback devices to oppose a resistance during a movement along at least one axis orthogonal to or about the longitudinal axis.

* * * * *